United States Patent [19]

Nagano et al.

[11] 4,149,143
[45] Apr. 10, 1979

[54] IMAGE SENSOR OUTPUT CORRECTING SYSTEM

[75] Inventors: Humikazu Nagano, Nara; Hiromu Sasaki, Yamatokooriyama; Syoichi Yasuda, Nara, all of Japan

[73] Assignee: Sharp Kabushiki Kaisha, Osaka, Japan

[21] Appl. No.: 818,203

[22] Filed: Jul. 22, 1977

[30] Foreign Application Priority Data

Jul. 30, 1976 [JP] Japan .................................. 51-92568

[51] Int. Cl.² .............................................. G06K 9/00
[52] U.S. Cl. ......................................... 340/146.3 AG
[58] Field of Search .............. 340/146.3 AG, 146.3 H, 340/146.3 AH, 146.3 R; 358/282, 284

[56] References Cited

U.S. PATENT DOCUMENTS

| | | |
|---|---|---|
| 3,820,068 | 6/1974 | McMillin .................... 340/146.3 AG |
| 3,944,977 | 3/1976 | Holmes et al. ............ 340/146.3 AG |
| 4,003,021 | 1/1977 | Sasaki et al. ............... 340/146.3 AG |
| 4,012,715 | 3/1977 | Essenmacher ............. 340/146.3 AG |

Primary Examiner—Leo H. Boudreau
Attorney, Agent, or Firm—Staas & Halsey

[57] ABSTRACT

An image sensor output correcting system wherein a correcting region of an object being read is scanned in advance by means of a sensor array, thereby to provide a correcting signal based on the signal obtained in the scanning operation for correcting the scanning video signal of the region being read, characterized in that the video signal obtained during the scanning operation of the correcting region is sampled with a predetermined interval, the video signals of the sensor corresponding to a plurality of scanning lines are compared, and the maximum value is stored as the correcting signal, whereby high speed scanning can be made without degrading the correcting function as compared with a system where the outputs of the respective sensors of the sensor array are analog to digital converted to generate the correcting signal.

4 Claims, 12 Drawing Figures

IMAGE SENSOR OUTPUT CORRECTING SYSTEM

BACKGROUND OF THE INVENTION

1. Field of the Invention

The present invention relates to a system for correcting the output from an image sensor for use in an image information reading apparatus employing a solid state array.

2. Description of the Prior Art

Recently a solid state image sensor using larger scale integration techniques, such as a photo diode array, a charge coupled device sensor or the like has been employed as a photoelectric converter in an optical image reading apparatus. However, in using a solid state image sensor having a multiplicity of bits, various problems are encountered. Firstly, the output from the solid state sensor is uneven in magnitude from bit to bit. Secondly, it is difficult to uniformly illuminate an object being read as a matter of practice. Thirdly, the reflectivity is different from object to object. A further problem is that the characteristics of the illumination lamp and the sensor output amplifiers could change with respect to time.

A scheme of interest for correcting the output from the image sensor for eliminating the above described problems are disclosed in Japanese Patent Laying-Open Gazette No. 126,132/1975 and the counterpart U.S. Pat. No. 4,003,021. More specifically, an object being read includes an output correcting portion where no information is recorded, the output correcting portion is scanned several times by a sensor array. The video signal having the best output is selected out of the outputs of the repeated scans and is stored as a correcting signal and whenever portion of the object being scanned contains recorded information, the optical information obtained from the portion being read is compared with a suitable slice level determined by the correcting signal, whereby the comparison output is converted into a logic one level or a logic zero level for transfer thereof as a sensor array output to a subsequent recognition circuit. Although the above described reading scheme provides a level correction of the optical information, the scanning speed of the sensor array is limited to the speed of the analog to digital conversion when converting the sensor output into a video signal to be applied to the recognition circuit, with the result being that high speed scanning is difficult.

SUMMARY OF THE INVENTION

Briefly described, the present invention comprises an image sensor output correcting system particularly suited for high speed scanning wherein an object being read includes an output correcting portion where no information is recorded, the output correcting portion is scanned by a sensor array, and the sensor output is converted into a bi-valued signal having either a logic one or a logic zero level while the slice level is precorrected when a portion of the object is scanned, characterized in that the sensor output obtained from the output correcting portion is intermittently sampled.

Therefore, a principal object of the present invention is to provide an improved image sensor output correcting system wherein a high speed scanning operation can be performed without degrading substantially the correcting function.

Another object of the present invention is to provide an improved image sensor output correcting system wherein an ideal video signal is provided.

These objects and other objects, features, aspects and advantages of the present invention will become more apparent from the following detailed description when taken in conjunction with the accompanying drawings.

DESCRIPTION OF THE PREFERRED EMBODIMENTS

Figure 1:
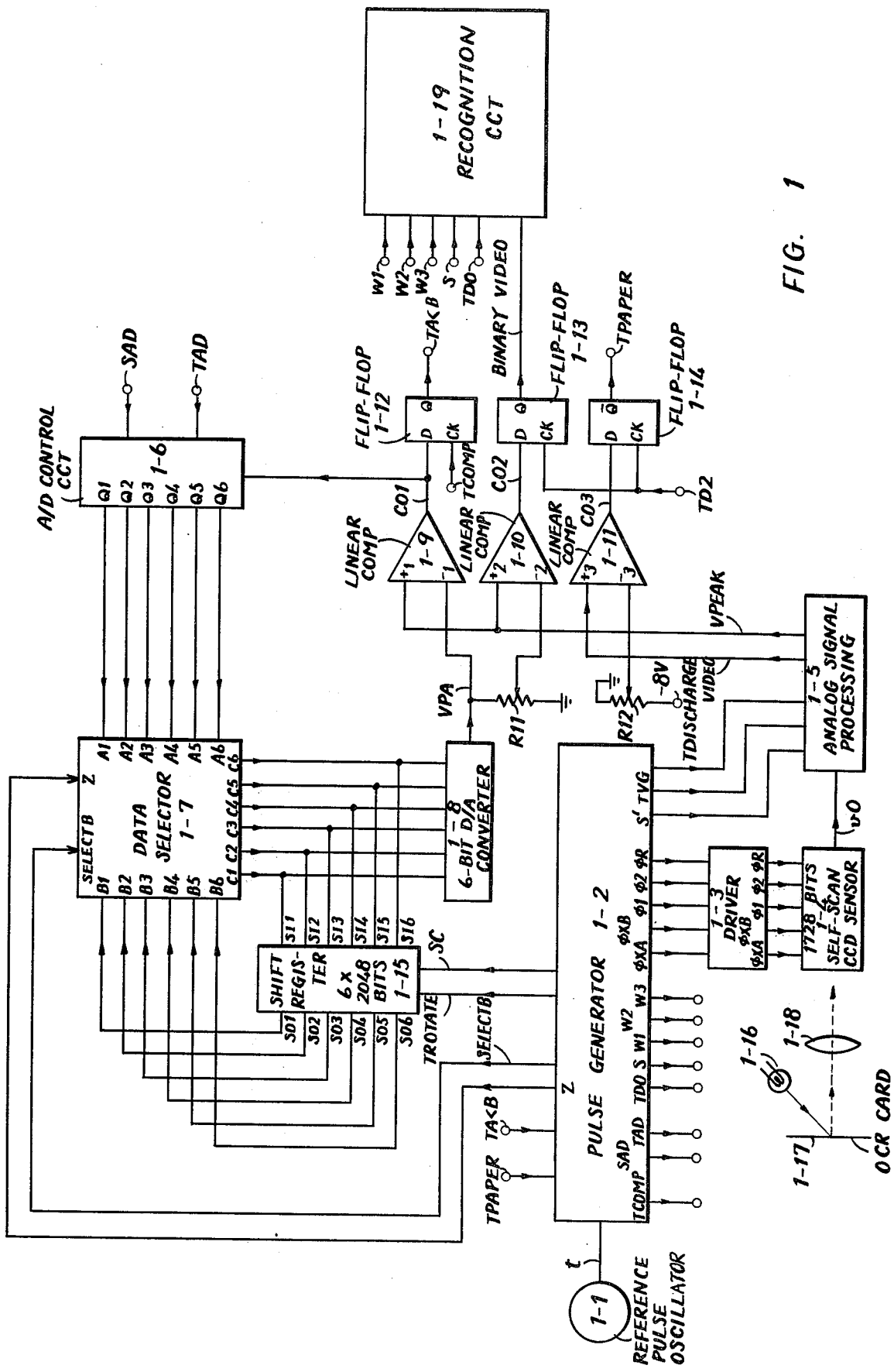
FIG. 1 is a block diagram showing one embodiment of the present invention.

For simplicity of description, the present invention will be described in the following as embodied in an optical character recognition apparatus employing a charge coupled device sensor of 1728 bits as a solid state sensor array. FIG. 1 shows a block diagram of one embodiment of the present invention which shows a correcting circuit of a reading apparatus employing the inventive image sensor output correcting system. Referring to FIG. 1, an oscillator 1-1 for generating a reference pulse t is provided. The reference pulse t generated by the oscillator 1-1 is applied to a pulse generator 1-2. The pulse generator 1-2 is connected to receive a signal TA<B from a flip-flop 1-12 and a signal TPAPER from a flip-flop 1-14. The pulse generator 1-2 is structured to be responsive to the TA<B signal and the TPAPER signal to provide various pulse signals Z, SELECTB, TCOMP, SAD, TAD, TDO, S, W1, W2, W3, $\phi$XA, $\phi$XB, $\phi$1, $\phi$2, $\phi$R, S'; TVG, TDISCHARGE and the like, as to be described subsequently. A detailed structure of the pulse generator 1-2 will be described with reference to FIG. 7. A driver 1-3 is connected to receive the pulse signals $\phi$XA, $\phi$XB, $\phi$1, $\phi$2, and $\phi$R from the pulse generator 1-2 and is structured to properly amplify these pulse signals to provide pulse signals $\phi$XA, $\phi$XB, $\phi$1, $\phi$2, $\phi$R, which are transferred to a self-scanning type charge coupled device sensor 1-4. As described previously, the charge coupled device sensor 1-4 comprises 1728 bits. As well known to those skilled in the art, the image of one scanning line on an optical character recognition card 1-17 as properly illuminated by a light source 1-16 will be focused on the sensor 1-4 by means of an optical lens 1-18, so that a sensor output signal v0 including the optical information is transferred to a subsequent analog signal processing circuit 1-5. The analog signal processing circuit 1-5 is connected to receive the pulse signals S', TVG, and TDISCHARGE from the said pulse generator 1-2 and is responsive to these signals to suitably sample, the sensor output signal V0 of the correcting region including the optical information, whereupon a video peak signal VPEAK is transferred to linear comparators 1-9 and 1-10 and a video signal VIDEO is transferred to a linear comparator 1-11.

A shift register 1-15 having capacity of 6×2048 bits is provided to store the correcting information. Since the charge coupled device sensor 1-4 of 1728 bits has been employed in the embodiment shown, 320 (=2048−1728bits of the shift register 1-15 are redundant. The analog signal obtainable from the above described analog processing circuit 1-5 is subjected to analog to digital conversion, as to be described subsequently. Since, in analog to digital conversion, the analog signal is converted into a 6-bit digital signal, a shift register of 6×2048 bits is advantageously employed.

Figure 9:
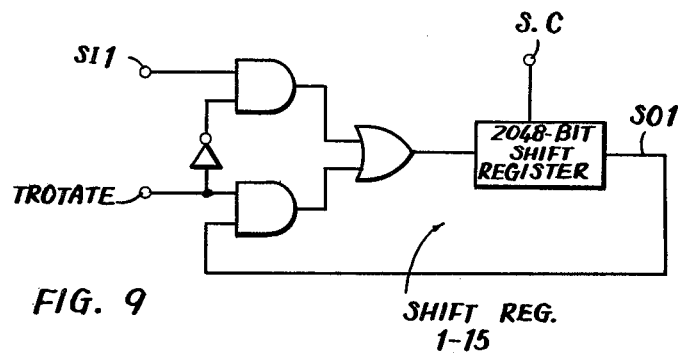
FIG. 9 is a block diagram showing in part the shift register 1-15.

The above described shift register 1-15 sends output signals obtainable from the output terminals SO1, SO2, . . . SO6 to the corresponding input terminals B1, B2, . . . B6, respectively, of a data selector and receives at the input terminals SI1, SI2, . . . SI6 the signals obtainable from the output terminals C1, C2, . . . C6, respectively, of the data selector 1-7. The shift register 1-15 is further connected to receive a shift clock SC from the pulse generator 1-2, such that the shift register 1-15 is responsive to the fall of the clock SC to effect a shifting operation. The shift register 1-15 is further connected to receive a data holding signal TROTATE for holding the stored contents. Out of six series of 2048-bit shift registers, only one series of the 2048-bit shift register is shown in FIG. 9 in a block diagram. As seen from the FIG. 9 diagram, the data loaded in the shift register is held through recirculation if and when the data holding signal TROTATE is in the logic one state.

Figure 10:
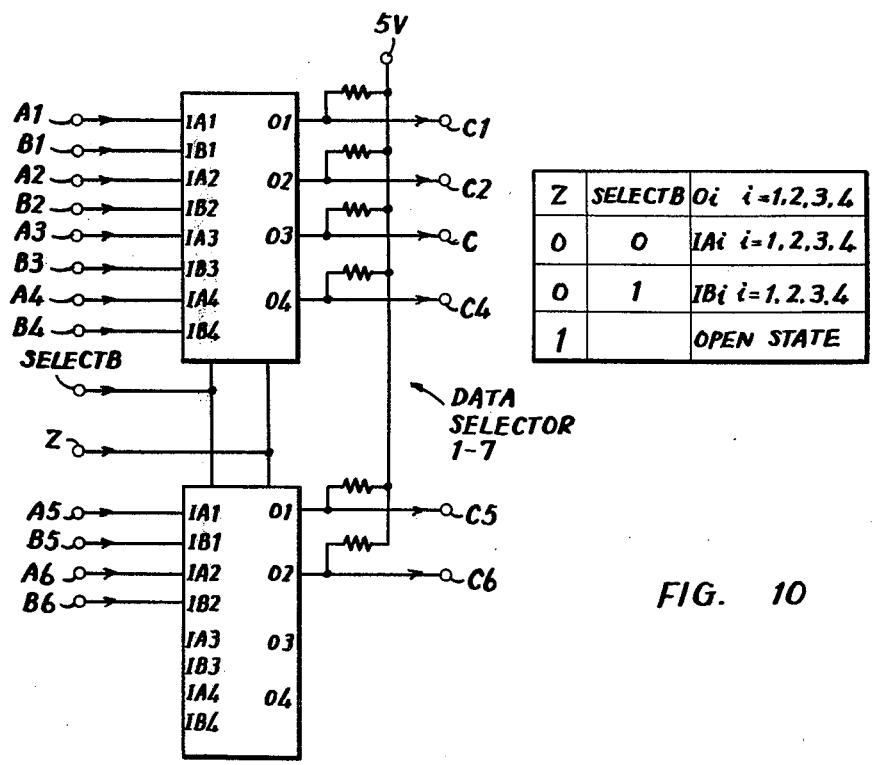
FIG. 10 shows a block diagram and a truth table of the data selector 1-7.

The data selector 1-7 comprises a decoder, as shown in FIG. 10, wherein the signals obtainable from the output terminals C1, C2, . . . C6 all become logic ones if and when the pulse signal Z obtainable from the pulse generator 1-2 is a logic one, irrespective of the logic state of the signals received by the remaining input terminals, whereas the signal of the input terminal Bi is obtained from the output terminal Ci, i.e. C1=B1, C2=B2, . . . C6=B6, if and when the signal Z is a logic zero and the signal SELECTB is a logic one, and the signal of the input terminal Ai is obtained from the output terminal Ci, i.e. C1=A1, C2=A2, . . . C6=A6, if and when the signal Z is a logic "zero" and the signal SELECTB is a logic zero.

When the Ci output signal of the data selector is introduced, a 6-bit digital-analog converter 1-8 serves to convert the input 6-bit signals C1, C2, . . . C6 into an analog signal and the resultant output signal VPA is transferred to the comparator 1-9. An analog-digital control circuit 1-6 is structured to be responsive to the analog-digital control clock signals SAD and TAD from the pulse generator 1-2 and a control signal CO1 from the comparator 1-9 to transfer the 6-bit outputs Q1, Q2, . . . Q6 through the input terminals A1, A2, . . . A6 of the data selector 1-7 and from the output terminals C1, C2, . . . C6 to the digital-analog converter 1-8.

Potentiometers R11 and R12, provided between the 6-bit digital-analog converter 1-8 and the comparators 1-10 and 1-11, are aimed to properly set the slice levels of the video signal stored in the shift register 1-15 with respect to the VIDEO signal obtained while the readable portion of the optical character recognition card is read.

The respective comparators 1-9, 1-10 and 1-11 are provided to assure that the signal levels at the respective input terminals achieve the following.

COi (i=1,2,3)="1" in case of $+_i > -_i$

COi (i=1,2,3)="0" in case of $+_i < -_i$

A recognition circuit 1-19 is structured to be responsive to the pulse signals W1, W2, W3, S and TDO from the pulse generator 1-2 to make recognition of the image upon receipt from the flip-flop 1-13 of a signal BINARY VIDEO obtained as a bivalued signal having either a logic one or a logic zero level based on the slice level.

The above described pulse signal W1 is adapted to assume a logic one level in the case where the optical character recognition card is passing on the scanning line of the sensor, the above described pulse signal W2 is adapted to assume a logic one level in the case where the correction information of the sensor at the correcting portion is obtained assuming that the leading edge of the optical character recognition card is utilized as the output correcting portion, and the pulse signal W3 is adapted to assume a logic one level in the case where the entry of the correction information is completed which indicates that the BINARY VIDEO signal from the flip-flop 1-13 has been converted into the bivalued form from the analog signal including the image information of the charge coupled device sensor at the slice level as fully corrected. In other words, the BINARY VIDEO signal has meaning only in the state of W3="1". The pulse signal S is a start pulse formed one time for each scanning line and the pulse signal TDO is a latch signal for the BINARY VIDEO signal introduced in series.

Figure 2:
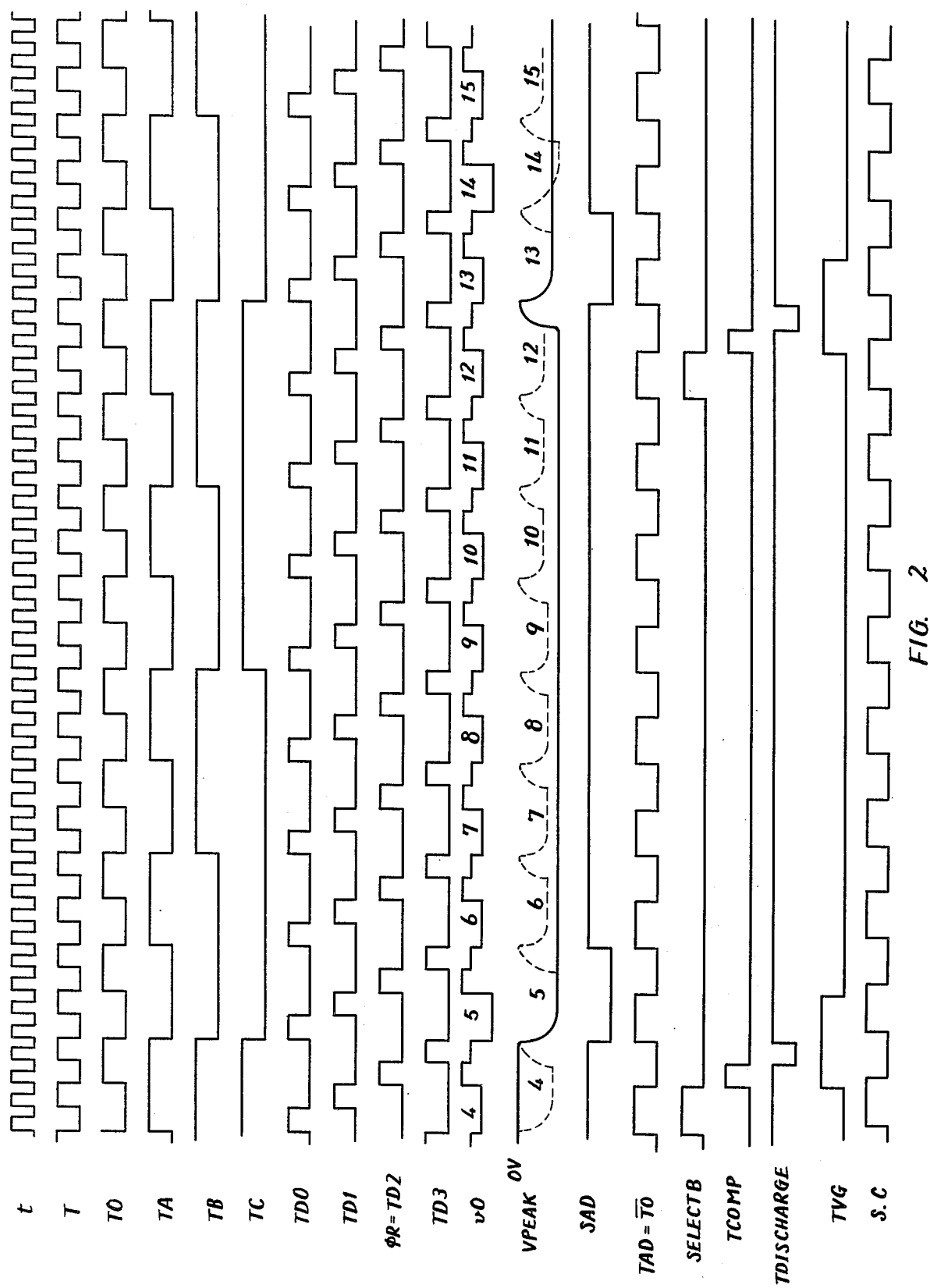
FIGS. 2 and 3 are time charts showing the relationship of the various pulse signals.
Figure 3:
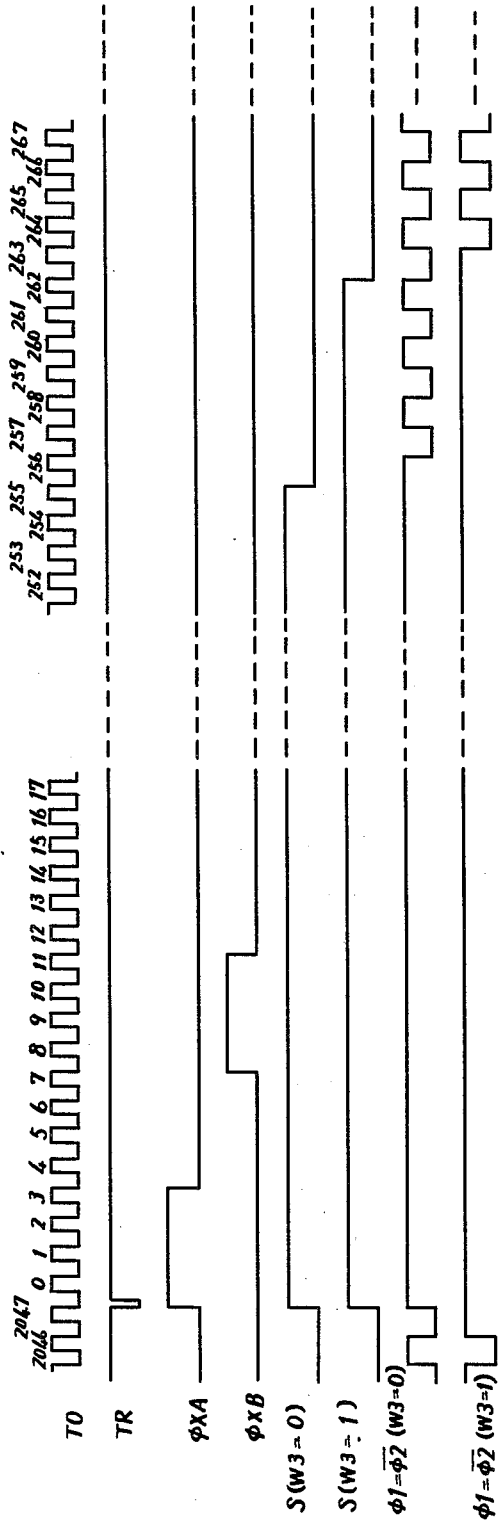
Figure 4:
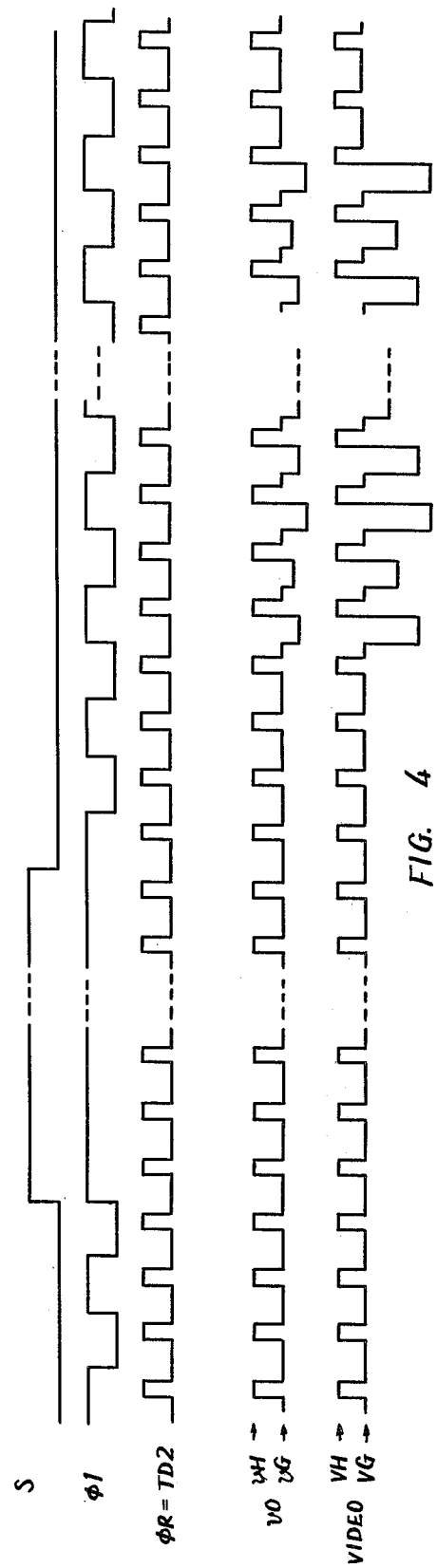
FIG. 4 is a time chart showing the relationship of the various pulse signals with respect to the outputs of the charge coupled device sensor.
Figure 5:
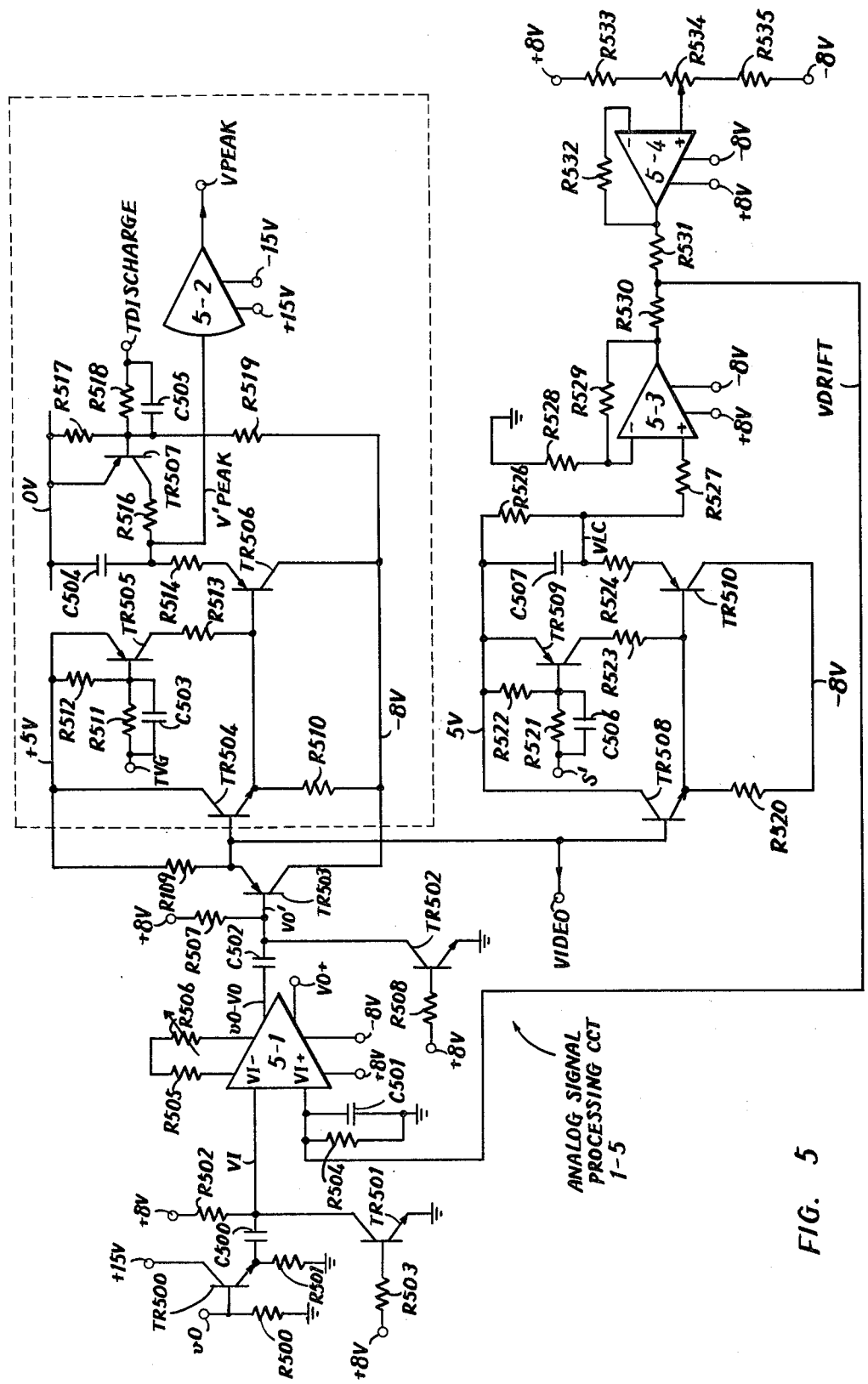
FIG. 5 is a schematic diagram showing in more detail the analog signal processing circuit.
Figure 6:
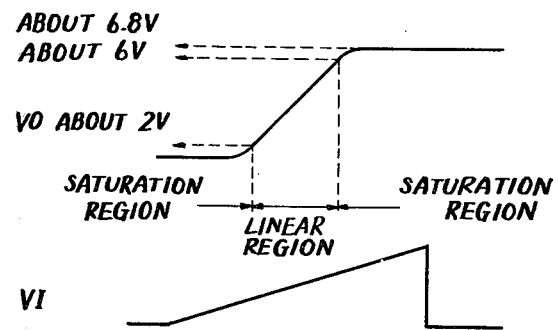
FIG. 6 is a graph showing the input/output characteristics of an amplifier used in the analog signal processing circuit.
Figure 8:
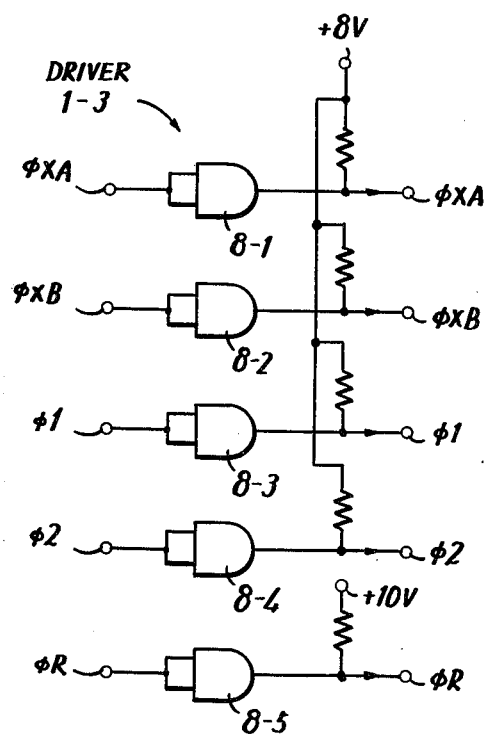
FIG. 8 is a block diagram showing the driver.
Figure 7:
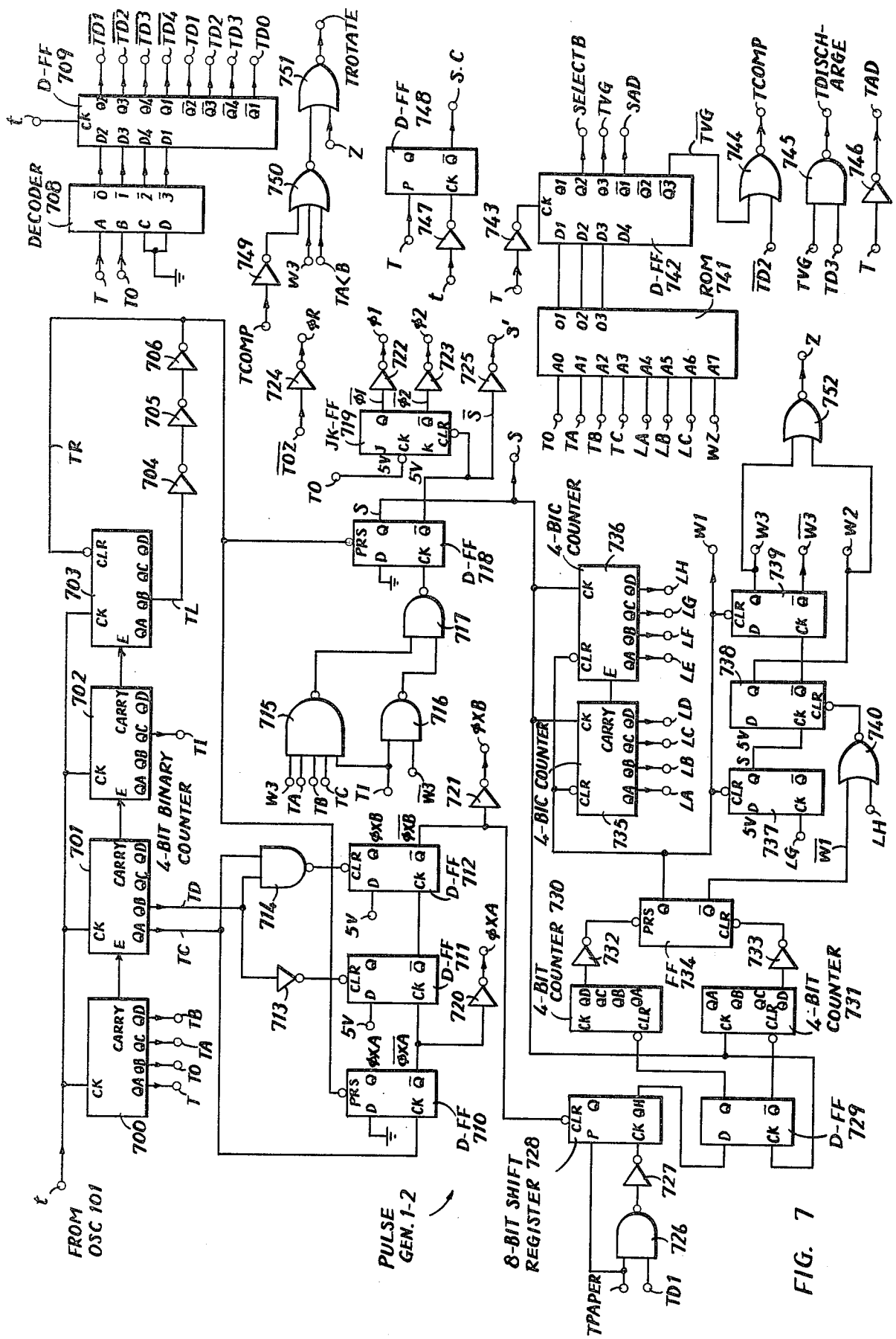
FIG. 7 is a block diagram showing in more detail the pulse generator.
Figures 11, 12:
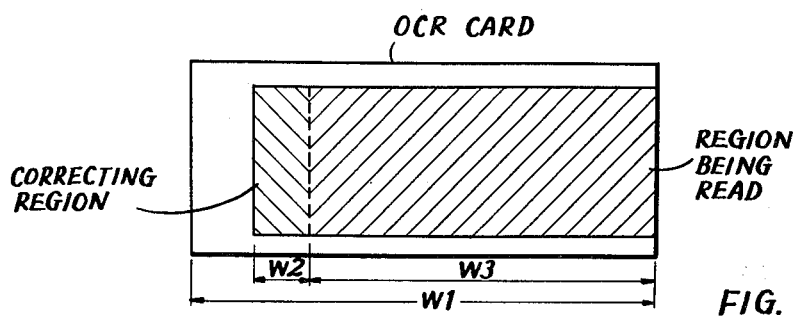
FIG. 11 is a schematic diagram of the optical character recognition card.
FIG. 12 is an enlarged view of the correcting region for explanation of the correcting operation of the sensor array.

FIGS. 2 and 3 are time charts showing the timing relationships of various pulse signals, and FIG. 4 is a time chart showing the time relationships of various pulse signals with respect to the output of the charge coupled device sensor. FIG. 5 is a schematic diagram showing in more detail the analog signal processing circuit 1-5. FIG. 6 shows the characteristics of the input and output of an amplifier used in the analog signal processing circuit. FIG. 7 is a block diagram showing in more detail the pulse generator 1-2. FIG. 8 is a block diagram showing in more detail the driver 1-3. FIG. 9 is a block diagram showing in more detail a portion of the shift register 1-15. FIG. 10 shows a block diagram of the data selector 1-7 and the truth table thereof. FIG. 11 is a view of the optical character recognition card. FIG. 12 is an enlarged view of the correcting region for explanation of the correcting operation of the sensor array.

Referring to FIGS. 2, 3 and 7, the relation of various pulse signals t, T, TO, TA, TB, TC, TDO, TD1, TD2, TD3, $\phi$XA, $\phi$XB, S, $\phi$1 and $\phi$2 of the pulse generator 1-2 will be described.

Referring to FIG. 7, the reference pulse t (4MHz) obtained from the oscillator 1-1 is applied to the clock input CK of 4-bit binary counters 700, 701, 702 and 703. Each of these 4-bit binary counters is adapted to make a count operation responsive to the rise of the clock input and the carry output of each of the counters 700, 701 and 702 is applied to the terminal E of each of the succeeding counters 701, 702 and 703, whereby a 16-bit binary counter is formed.

The output signal TL obtained from the output terminal QB of the counter 703 is made to pass through three inverters 704, 705 and 706 and an inverted output signal TR is applied to a clear terminal CLR of the counter 703. Thus, the signal TR is obtained that assumes a logic zero level once each time 8192 reference pulses t are received. Referring to FIG. 3, the said signal TR is a signal that assumes a logic zero level once each time 2048 pulse signals T0 are received in terms of the signals T0 obtained from the output terminal QB of the counter 700.

Assuming that the outputs obtainable at the output terminals QA, QB, QC and QD of the counter 700, the outputs obtainable at the output terminals QA and QB of the counter 701, and the output obtainable at the output terminal QC of the counter 702 are denoted by the reference characters T, T0, TA, TB, TC, TD and TI, respectively, the timing relationships of these pulse signals is shown in the FIG. 2 time chart.

The preset input terminal PRS of a D flip-flop 710 is supplied with the signal TR and the clock input terminal CK of the D flip-flop 710 is supplied with the signal TC, while the data input terminal D is grounded. Accordingly, the output signal $\phi XA$ from the Q output of the flip-flop 710 assumes a logic one level when a signal TR assumes the logic zero level and assumes a logic zero level when the signal TC assumes a logic one level. On the other hand, the output signal $\overline{\phi XA}$ of the $\overline{Q}$ output of the flip-flop 710 is connected to the clock input terminal of the succeeding D flip-flop 711, the data input D of which is supplied with a voltage of 5V and the clear terminal of which is supplied with the signal $\overline{TD}$ as inverted by means of an inverter 713 of the signal TD. Therefore, the output signal at the Q output of the said flip-flop 711 assumes a logic zero level when the signal $\phi XA$ assumes a logic zero level and assumes a logic one level when the signal TD assumes a logic one level. The $\overline{Q}$ output of the flip-flop 711 is connected to the clock terminal CK of the succeeding D flip-flop 712, the data input D of which is similarly supplied with a voltage of 5V and the clear terminal CLR of which is supplied with a signal $\overline{TD \cdot TC}$ obtained from a NAND gate 714 connected to receive the signals TO and TC. Therefore, the output signal $\phi XB$ at the Q output of the flip-flop 712 assumes a logic one level when the $\overline{Q}$ output of the preceding flip-flop 711 assumes a logic one level and assumes a logic zero level when both signals TD and TC assume a logic one level.

The data input D of a D flip-flop 718 is grounded and the preset input terminal PRS of the D flip-flop 718 is supplied with the signal TR. The clock terminal CK of the D flip-flop 718 is supplied with the output of a NAND gate 717, one input of which is connected to receive the output of a NAND gate 715 connected to receive the signals W3, TA, TB, TC and TI and the other input of which is connected to receive the output of a NAND gate 716 connected to receive the signals TI and $\overline{W3}$, so that the clock terminal CK of the flip-flop 718 is supplied with the signal TA·TB·TC·TI when a signal W3 assumes the logic one level and the same is supplied with the signal TI when the signal W3 assumes a logic zero level. Therefore, the output signal S obtained from the Q output of the flip-flop 718 becomes a logic one when the signal TR becomes a logic zero, and becomes a logic zero when the signal TI becomes a logic one while the signal W3 is at a logic zero level, and in addition, becomes a logic zero when the signals TA, TB, TC and TI become logic ones while the signal W3 is at a logic one level.

Now referring to FIG. 3, it is seen that there occurs a difference of seven pulses in the pulse width of the signal S in terms of the signal T0 between the state where the signal W3 assumes a logic zero level and the state where the signal W3 assumes a logic one level. This point will be described in more detail subsequently in conjunction with the description of the operation.

The clear terminal CLR of a J-K flip-flop 719 is connected to receive the signal S of the output $\overline{Q}$ of the D flip-flop 718 and the clock terminal CK of the flip-flop 719 is connected to receive the signal T0, the input terminals J and K being supplied with a voltage of 5V. Therefore, the output signal $\phi 1$ obtained from the Q output of the flip-flop 719 becomes a logic zero when the signal S assumes a logic one state and becomes a logic one in response to the rise of the signal T0 after the signal S turns to a logic zero.

A decoder 708 is provided. The input terminals A and B of the decoder 708 are connected to receive the signal T and T0, respectively, and the outputs $\overline{0}, \overline{1}, \overline{2}$, and $\overline{3}$ of the decoder 708 are connected to the input terminals D2, D3, D4 and D1, respectively, of the succeeding stage 4-D flip-flop 709. The clock terminal CK of the flip-flop 709 is connected to receive the reference pulse t. The output signals TD0, TD1, TD2 and TD3 obtainable at the output terminals Q1, Q2, Q3, Q4, respectively, of the flip-flop 709 change their state in response to the rise of the reference pulse t. Thus, the above described output signals may be expressed as follows.

$TD0 = \overline{T \cdot T0}$
$TD1 = T \cdot \overline{T0}$
$TD2 = T \cdot T0$
$TD3 = \overline{T} \cdot \overline{T0}$ The output signal $\overline{\phi XA}$ obtainable at the $\overline{Q}$ output of the flip-flop 710, the output signal obtainable at the Q output of the flip-flop 712, the output signal $\overline{\phi 1}$ obtainable at the Q output of the flip-flop 719, the output signal $\overline{\phi 2}$ obtainable at the Q output of the flip-flop 719, and the output signal $\overline{TD2}$ obtainable at the Q3 output of the flip-flop 709 are inverted through inverters 720, 721, 722, 723 and 724, respectively, to become the signals $\phi XA$, $\phi XB$, $\phi 1$, $\phi 2$ and $\phi R$, respectively, which are transferred to the driver 1-3 shown in FIG. 1 and are amplified by means of a circuit shown in FIG. 8 to a suitable level to become the signals $\phi XA$, $\phi XB$, $\phi 1$, $\phi 2$ and $\phi R$, respectively, which are further transferred to the charge coupled device sensor 1-4, whereby the self scanning of the sensor array is effected. The timing relation of the above described output signals is shown in the time charts in FIGS. 2 and 3.

Now an amplifier circuit for a charge coupled device sensor employed in the embodiment of the present invention will be described using as an example of a 1728-device charge coupled device the model 121 device manufactured by Fairchild, and thereafter the remaining portion of the pulse generator 1-2 shown in FIG. 7 will be described.

Referring to FIG. 5, a schematic diagram of the analog signal processing circuit 1-5 is shown. The output of the charge coupled device sensor 1-4 is applied to an MOS transistor provided at the output of the charge coupled device sensor and the output is withdrawn as a sensor output signal v0 across a resistor R500 which is grounded at one end and is connected to the input of the analog signal processing circuit 1-5. The relation of the charge coupled device sensor output v0 and various clocks is shown in FIGS. 3 and 4.

The sensor output signal v0 is withdrawn as a waveform comprising a signal containing optical information superimposed with clock noise caused by the reset clock φR, wherein the direct current level of the signal v0 is several volts while the clock noise and the signal containing optical information are several hundred mV in magnitude. Accordingly, in the sensor output v0 shown in FIG. 4, the level vG is several volts and the clock noise (vH−vG) is several hundred mV, wherein the level vG is the signal reference level of the containing optical information (referred to as "an optical signal" hereinafter). The optical signal appears in the negative going direction with respect to the reference level vG and is about several hundred mV in magnitude.

One problem encountered in the actual operation is that the level of the sensor output v0 drifts or fluctuates by virtue of the ambient temperature, the drift being caused by variation of the ON resistance of the MOS transistor provided at the output portion of the charge coupled device sensor. Hence, the embodiment shown is structured to eliminate such a problem.

Referring to FIG. 5, the sensor output signal v0 is received by an emitter follower implemented by a transistor TR500 and a resistor R501 and the output therefrom is applied through a level shifting capacitor C500 to the collector of a transistor TR501 and one input terminal VI− of a differential amplifier 5-1. A clamp circuit is formed by resistors R502 and R503 and the transistor TR501, wherein the resistance of the resistor R502 is selected to be smaller than the input impedance of the above described differential amplifier 5-1 and the time constant determined by the capacitor C500 and the resistor R502 is selected to be sufficiently longer than the scan period of the charge coupled device sensor 1-4 which is equal to the period of the start pulse S shown in FIGS. 3 and 4. The value of resistance of the resistor R503 is selected to be as large as several ten times the value of resistance of the resistor R502. The signal V1 applied to the input terminal VI− of the amplifier 5-1 is the signal as level shifted, of the sensor output v0, wherein the highest level vH corresponds to the saturation voltage of about +200mV of the transistor TR501 as clamped in the signal V1.

The above described amplifier 5-1 is supplied with the operating voltages +8V and −8V and is provided with resistors R505 and R506 for the purpose of gain adjustment. The other input terminal VI+ of the amplifier 5-1 is supplied with a signal VDRIFT generated by the circuit to be described and the input terminal VI+ is also grounded through a shunt combination of a resistor R504 and a capacitor C501. The output of the amplifier 501 is withdrawn as a signal V0 from the terminal V0−.

In the case where the amplifier 5-1 is operated with source voltages of +8V and −8V, the output V0 changes within the amplitude range of about +1V to about +6.8V, but as seen in the input/output characteristics shown in FIG. 6, the linear region ranges from about 2V to about 6V. Therefore, if the linear region is utilized, the output lower than the upper limit of the output V0 by the value of 6.8−6=0.8V must be used. According to the embodiment shown, the voltage of 0.8V is developed by the use of the saturation voltage of a transistor TR502 and the base-emitter voltage VBE of an emitter follower transistor TR503.

The output V0 of the amplifier is level shifted by means of a level shifting capacitor C502 to be V0′ and is applied to one end of a resistor R507, the collector of the transistor TR502 and the base of the transistor TR503. The above described resistor R507, the transistor TR502 and a resistor R508 form a clamp circuit, where the upper limit of the above described signal V0′ is clamped to +100mV∼200mV. The time constant of the capacitor C502 and the resistor R507 is selected to be sufficiently longer than the scanning period of the charge coupled device sensor and the value of the resistance of the resistor R508 is selected to be as large as several ten times the value of resistance of the resistor R507.

The transistor TR503 and a resistor R509 form an emitter follower. Wherein the emitter provides the VIDEO signal from the analog signal processing circuit 1-5 to the comparator. The said VIDEO signal is a signal as level shifted in the positive going direction by the voltage value VBE of the transistor TR503 with respect to the above described signal V0′, and level adjustment is made by means of a potentiometer R534 such that the reference level VG of the optical signal of the VIDEO signal may be the ground level of the circuit.

An offset adjusting circuit is formed by resistors R533, R534, R535, R532 and R531 and an operational amplifier 5-4, wherein the signal as adjusted by the potentiometer R534 is applied to the input terminal VI+ of the said differential amplifier 5-1 as the signal VDRIFT, whereby the reference level VG of the video signal is brought close to the ground potential.

Considering the fact that the magnitude (VH-VG) of the VIDEO signal is the saturation voltage of the transistor TR502 + the voltage VBE of the transistor TR503 and equals about 0.8V and while the output V0 of the differential amplifier 5-1, as level shifted, is the VIDEO signal, it is seen that the optical signal of the VIDEO signal, as amplified and level shifted by the differential amplifier 5-1, has a linear relationship with the optical signal, as introduced in the input terminal VI−.

As described previously, the reference level VG of the VIDEO signal is brought close to the ground level of the circuit through adjustment of the potentiometer R534. If in such adjustment the potentiometer R506 is adjusted and then the gain of the amplifier 5-1 is changed in an attempt to amplify the optical signal to a suitable magnitude after the reference level VG is made close to the ground level of the circuit, then the reference level VG is liable to shift from the ground level of the circuit. Such a disadvantage can be solved by a drift correcting circuit implemented by transistors TR508, TR509 and TR510 and an operational amplifier 5-3 and other components. The function of the drift correcting circuit is to negatively feedback to one terminal VI− of the differential amplifier 5-1 any downward variations of the reference level VG of the video signal caused for some reasons, so as to stabilize the reference level VG. Thus, it becomes necessary to correct the variation or the drift of the reference level VG responsive to the ground level. According to the embodiment shown, the peak value in the negative going direction of the video signal when the clock φ1 is the high level, (i.e. a start pulse S is the logic one), is adopted as the reference level VG.

Now the above described drift correcting circuit will be described in more detail in the following. The VIDEO signal is received by the emitter follower implemented by the transistor TR508 and the resistor R520. The emitter of the transistor TR508 serves to clamp the base of the transistor TR510 to higher than 0V by means of the circuit comprising the transistor TR509, the resistors R523, R522 and R521 and the capacitor C506 when a signal S' (S'=S) assumes the logic zero level and to transfer the VIDEO signal to the base of the transistor TR510 when the signal S' assumes a logic one level.

The capacitor C507 serves to hold the level VG of the VIDEO signal and is charged through the resistor R524 and discharged through the resistor R526. Assuming that one end of the capacitor 507 is VLC (LEVEL, CLAMP), the time constant of the capacitor C507 and the resistor R526 is selected to be as large as several hundred times the scanning period of the charge coupled device sensor and the time constant of the capacitor C507 and the resistor R524 is selected to be as large as several times the scanning period, then the above described level VLC follows the reference level VG of the video signal with a slight delay. The level VLC is amplified by several ten times by means of a non-inverting amplifier comprising an operational amplifier 5-3 and the amplified signal is withdrawn through a resistor R530 as the signal VDRIFT, which is negative feedback to one input terminal VI+ of the differential amplifier 5-1. Thus, the signal VDRIFT comprises a superposition of the signal of the potentiometer R534 bringing the reference level VG of the VIDEO signal to the ground level of the circuit and the signal of the resistor R506 keeping the level VG so as not to be off the ground level of the circuit. In actuality, the system is designed such that the period when the start pulse S is the logic one, (i.e. $\phi1$ is at a high level where no optical signal appears in the sense output V0) may be sufficiently long, and in the present embodiment the period when the signal S is a logic one is selected to be as long as 256 pulses calculated in terms of the signal T0.

Thus, as the amplifier of the charge coupled device sensor, the difference of the voltages VBE of the NPN transistor TR508 and the PNP transistor TR510 in the correcting circuit can be adjusted by means of the potentiometer R534 of the offset adjusting circuit, and the drift of the saturation voltage of the transistors TR501 and TR502, the variation of the voltage VBE of the transistor TR503, and the like can be corrected by means of the drift correcting circuit, with the result that the reference level of the optical signal can be stabilized. The remaining portion of the FIG. 5 circuit will be described subsequently.

Again description will be made of the output correcting circuit of the sensor array for high speed scanning in accordance with the present invention. Referring to FIG. 1, the VIDEO signal as amplified and level corrected by the above described analog signal processing circuit 1-5 is applied to the plus input terminal t3 of the comparator 1-11. Adjustment has been made such that the optical signal component in the said VIDEO signal appears as the potential of $-3 \sim -2$ volt when the white portion of the optical character recognition card is passing on the scanning line of the charge coupled device sensor 1-4. On the other hand, the optical signal component in the case where no optical character recognition card exists on the scanning line is approximately zero. It is pointed out that the more the light beam impinges on the charge coupled device sensor 1-4, the more the optical signal component of the VIDEO signal appears in the minus direction.

The $-3$ input terminal of the said comparator 1-11 is supplied with $-1.6V$ by the potentiometer R12, and when the white portion of the optical character recognition card is passing on the scanning line of the charge coupled device sensor 1-4, the inequality $t3 < -3$ exists between the input signals of both input terminals of the comparator 1-11, so that the output CO3 of the comparator 1-11 becomes a logic zero and the signal TPAPER of the $\overline{Q}$ output of the D flip-flop 1-14 that has latched the signal CO3 becomes a logic one. The signal TPAPER indicates whether the white region of the optical character recognition card exists on the scanning line of the charge coupled device sensor 1-4, wherein the signal TPAPER assumes the logic zero when no optical character recognition card exists on the scanning line.

Now assuming a state where the signal TPAPER becomes a logic one, description will be made again with reference to FIG. 7. The signal TPAPER and the signal TD1 are applied to the NAND gate 726 and the output signal TPAPER·TD1 obtained therefrom is inverted by an inverter 727 and is applied to the clock terminal CK of an 8-bit shift register 728. The signal TPAPER is also applied to the data input terminal D of the said 8-bit shift register 728. The clear terminal CLR of the 8-bit shift register 728 is supplied with the signal $\phi XB$ of the flip-flop 712. The shift register 728 is structured to be responsive to the rising edge of the clock to make a shift operation. The shift register 728 is further structured such that the eighth bit output QH assumes a logic the value level responsive to the rising edge of the subsequent start pulse S if and when eight or more out of 1728 optical signals in the VIDEO signal, corresponding to the number of bits of the sensor, have the exceeding minus 1.6V whereas the eighth bit output QH assumes a logic zero level if the number of optical signals having the value exceeding $-1.6V$ decreases less than eight. The eighth bit output QH of the shift register 728 is coupled to the input D of the subsequent state D flip-flop 729, the clock terminal CK of which is supplied with the start signal S.

The Q output of the D flip-flop 729 is connected to the clear terminal CLR of a 4-bit counter 730 and the $\overline{Q}$ output of the D flip-flop 729 is connected to the clear terminal CLR of a 4-bit counter 731, the clock terminals CK of these 4-bit counters 730 and 731 being supplied with the start signal S. The respective QD outputs of the 4-bit counters 730 and 731 are inverted by inverters 732 and 733 and are applied to the preset terminal PRS and the clear terminal CLR, respectively, of a flip-flop 734. The Q output of the said flip-flop 734 is withdrawn as the signal W1. The signal W1 assumes a logic one level with a delay of one scanning operation if and when the scanning of eight or more optical signals having the value exceeding $-1.6V$ out of 1728 optical outputs of the charge coupled device sensor 1-4 occurs consecutively more than eight times, whereas the signal W1 assumes a logic zero level with a delay of one scanning operation if and when the scanning of less than eight of the optical signals having the value exceeding $-1.6V$ occurs consecutively more than eight times. In other words, the signal W1 indicates that the optical character recognition card is passing on the scanning line of the charge coupled device sensor 1-4. The signal W1 is applied to the clear terminals of the 4-bit counters 735 and 736, both of which form an 8-bit counter, the clock terminals thereof being supplied with the start pulse S. In other words, the 8-bit counter serves to count the number of scanning lines responsive to the start signal S while the signal W1 assumes a logic one, wherein the output signals are denoted as LA, LB, LC, LD, LE, LF, LG and LH.

The clock input of a flip-flop 737 is supplied with the signal LG and the clear terminal CK of the flip-flop 737 is supplied with the signal W1. The Q output of the flip-flop 737 is connected to the clock terminal CK of the succeeding stage flip-flop 738. The clear terminal CLR of the flip-flop 738 is supplied with the output of a NOR gate 740 which is connected to receive the signals $\overline{W1}$ and LH and hence provides the signal $\overline{W1 \cdot LH}$. The Q output of the dlip-flop 738 is withdrawn as the signal W2. The clock terminal CK of the flip-flop 739 is supplied with the Q output of the flip-flop 738, i.e. the signal $\overline{W2}$. The clear terminal CLR of the flip-flop 739 is supplied with the signal W1. The Q output of the flip-flop 739 is withdrawn as the signal W3.

Thus, as shown in the schematic diagram of the optical character recognition card of FIG. 11, the signal W1 assumes a logic one level whenever the optical character recognition card exists on the scanning line of the charge coupled device sensor and the signal W2 becomes a logic one at the sixty-fourth scanning line after the signal W1 became a logic "one", and the signal W2 turns to a logic zero at the sixty-fourth scanning line as set as the correcting region after the signal W2 became a logic one, whereupon the signal W3 becomes a logic one simultaneously to form the region being read of the image information.

If and when the optical character recognition card passes from on the scanning line of the charge coupled device sensor 1-4, the signal W1 turns to a logic zero and simultaneously the signal W3 also turns to a logic zero.

A clock generator is implemented by an inverter 747 and a D flip-flop 748, that generates the shift clock SC of the 6×2048 bit shift register 1-15. The timing relationships of the various clocks is shown in FIG. 2.

A NOR gate 752 is connected to receive the Q output of the flip-flop 738 and the Q output of the said flip-flop 739, thereby to provide the output $Z = \overline{W2 + W3}$. A NOR gate 751 is connected to receive the signal Z and the output of the preceeding stage NOR gate 750 connected to receive through an inverter 749 the signal TCOMP, and directly two signals W3 and TA<B. Therefore, the NAND gate 751 provides the output TROTATE which may be expressed as follows.

TROTATE =

$\overline{\overline{W3 + TA<B + \overline{TCOMP}} + Z} = (W3 + TA<B + \overline{TCOMP}) \cdot \overline{Z}$ $= (W3 + TA<B + \overline{TCOMP})(W2 + W3)$ A block 741 comprises a read only memory (ROM), the input terminals A0, A1, . . . A7 of which are connected to receive the signals T0, TA, TB, TC, LA, LB, LC and W2, respectively, obtained from the output terminals of the 4 bit binary counters 700, 701, 735 and 736. The output terminals O1, O2 and O3 of the read only memory 741 are connected to the three data inputs D1, D2 and D3 of a D flip-flop 742. The clock terminal CK of the flip-flop 742 is supplied with the signal $\overline{T}$ obtained through inversion of th signal T by an inverter 743. The said read only memory 741 is preloaded with information such that the outputs of the D flip-flop 742, Q2=SELECTB, Q3=TV·G(VIDEO, GATE), and $\overline{Q1}$=SAD, with respect to the given input signals may satisfy the following logic equations.

SELECTB = $\overline{W2}$ + W2{$\overline{T0}$ · (TA · TB · TC · $\overline{LA}$ · $\overline{LB}$ · $\overline{LC}$ + $\overline{TA}$ · $\overline{TB}$ · $\overline{TC}$ · LA · $\overline{LB}$ · $\overline{LC}$ + TA · $\overline{TB}$ · $\overline{TC}$ · $\overline{LA}$ · LB · $\overline{LC}$ + $\overline{TA}$ · TB · $\overline{TC}$ · LA · LB · $\overline{LC}$ + $\overline{TA}$ · $\overline{TB}$ · TC · LA · $\overline{LB}$ · LC + TA · $\overline{TB}$ · TC · $\overline{LA}$ · LB · LC + $\overline{TA}$ · TB · TC · LA · LB · LC + TA · TB · $\overline{TC}$ · $\overline{LA}$ · $\overline{LB}$ · LC)}

TV · G = $\overline{W2}$ + W2{T0(TA · TB · TC · $\overline{LA}$ · $\overline{LB}$ · $\overline{LC}$ + $\overline{TA}$ · $\overline{TB}$ · $\overline{TC}$ · LA · $\overline{LB}$ · $\overline{LC}$ + TA · $\overline{TB}$ · $\overline{TC}$ · $\overline{LA}$ · LB · $\overline{LC}$ + $\overline{TA}$ · TB · $\overline{TC}$ · LA · LB · $\overline{LC}$ + $\overline{TA}$ · $\overline{TB}$ · TC · LA · $\overline{LB}$ · LC + TA · $\overline{TB}$ · TC · $\overline{LA}$ · LB · LC + $\overline{TA}$ · TB · TC · LA · LB · LC + TA · TB · $\overline{TC}$ · $\overline{LA}$ · $\overline{LB}$ · LC) + $\overline{T0}$($\overline{TA}$ · $\overline{TB}$ · $\overline{TC}$ · $\overline{LA}$ · $\overline{LB}$ · $\overline{LC}$ + TA · $\overline{TB}$ · $\overline{TC}$ · LA · $\overline{LB}$ · $\overline{LC}$ + $\overline{TA}$ · TB · $\overline{TC}$ · $\overline{LA}$ · LB · $\overline{LC}$ + TA · TB · $\overline{TC}$ · LA · LB · $\overline{LC}$ + $\overline{TA}$ · $\overline{TB}$ · TC · $\overline{LA}$ · $\overline{LB}$ · LC + TA · $\overline{TB}$ · TC · LA · $\overline{LB}$ · LC + $\overline{TA}$ · TB · TC · $\overline{LA}$ · LB · LC + TA · TB · TC · LA · LB · LC)}

SAD = $\overline{TA \cdot TB \cdot TC \cdot LA \cdot LB \cdot LC}$ + $\overline{TA \cdot \overline{TB} \cdot \overline{TC} \cdot LA \cdot \overline{LB} \cdot \overline{LC}}$ + $\overline{\overline{TA} \cdot TB \cdot \overline{TC} \cdot \overline{LA} \cdot LB \cdot \overline{LC}}$ + $\overline{TA \cdot TB \cdot \overline{TC} \cdot LA \cdot LB \cdot \overline{LC}}$ + $\overline{\overline{TA} \cdot \overline{TB} \cdot TC \cdot \overline{LA} \cdot \overline{LB} \cdot LC}$ + $\overline{TA \cdot \overline{TB} \cdot TC \cdot LA \cdot \overline{LB} \cdot LC}$ + $\overline{\overline{TA} \cdot TB \cdot TC \cdot \overline{LA} \cdot LB \cdot LC}$ + $\overline{TA \cdot TB \cdot TC \cdot LA \cdot LB \cdot LC}$ A NOR gate 744 is connected to receive the signals TVG and $\overline{TD2}$, thereby to provide the output signal TCOMP=$\overline{TVG \cdot TD2}$. A NAND gate 745 is connected to receive the signals TVG and TD3 to provide the output signal TDISCHRGE=$\overline{TVG \cdot TD3}$. An inverter 746 serves to invert the signal T to provide the output signal TAD=$\overline{T}$.

Now description will be made of the portion enclosed within the dotted line in the analog signal processing circuit 1-5 shown in FIG. 5 which has been left unexplained. The VIDEO signal is applied to the base of an emitter follower transistor TR504. The emitter of the transistor TR504 is supplied through a resistor 510 with the voltage of −8V. The emitter of the transister TR 504 is also connected to one end of a resistor R513 and the base of a transistor TR506. The other end of the resistor R513 is connected to the collector of a transistor TR505. The value of the resistance of the resistors R510 and R513 is selected such that if and when the signal TVG obtained from the Q3 output of the 4-bit D flip-flop 742 of the above described pulse generator becomes the logic zero the transistor TR505 turns on when the emitter of the transistor TR 504 becomes higher than 0V. Thus, in case of TVG="0", the emitter of the transistor TR504 is clamped higher than 0V, whereby the VIDEO signal is not transferred to the base of the transistor TR 506.

The collector of the transistor TR 506 is supplied with the voltage of −8V and the emitter of the transistor TR506 is connected to one end of a resistor R514. The other end of the said resistor R514 is connected to one end of a capacitor C504 and the other end of the said capacitor C504 is grounded. Therefore, it follows that the VIDEO signal and the emitter potential of the transistor TR506 are of substantially the same potential level. As shown in FIG. 2, the optical signal included in the VIDEO signal appears during the period between the rise of the signal TD0 and the rise of the signal TD2 and the time constant determined by the resistor R514 and the capacitor C504 is selected such that the potential VPEAK at one end of the capacitor C504 approaches the level of the VIDEO signal during the said period. After the rise of the signal TD2, the optical signal included in the VIDEO signal is reset to be 0V. In such a situation the junction between the base and emitter of the transistor TR506 is reverse biased and the transistor TR507 is turned off.

A voltage follower circuit 5-2 connected to one end of the capacitor C504 exhibit a high input resistance, so that the charge on the capacitor C504 is held relatively constant and accordingly the level of the potential VPEAK is also held constant, which is withdrawn as the signal VPEAK.

If and when the signal TDISCHARGE given as TVG·TD3 becomes a logic zero, a transistor TR507 turns on and the charge stored in the capacitor 504 is discharged through the resistor R516 and the transistor TR507. If and when the signal TDISCHARGE returns to a logic one, simultaneously the optical signal appears in the VIDEO signal and the above described operation is repeated.

Referring to FIG. 1, in the state where the optical character recognition card does not appear on the scanning line of the charge coupled device sensor 1-4, the signals W1, W2 and W3 are a logic zero. In such a situation the signal Z (=$\overline{W2+W3}$) applied to the data selector 1-7 assumes a logic one level and the output signals at the output terminals C1, C2, ... C6 all become a logic one. On the other hand, the TROTATE signal (W3+TA>B+TCOMP)·Z applied to the 6×2048 bit shift register 1-15 becomes a logic zero, and in such a situation the shift register receives from the input terminal the new data signals SI1=C1=1, SI2=C2=1, ... SI6=C6=1, in succession, while the old data signals SO1, SO2, ... SO6 are withdrawn in succession. In other words, during the period of W1="0", the contents in the shift register 1-15 all become logic ones, i.e. are returned to the cleared state. It should be pointed out that the signal processing effected by the analog-digital control circuit 1-6, the data selector 1-7 and the shift register 1-15 have been described in terms of the so called negative logic.

The clear operation of the shift register 1-15 is continued even after the signal W1 becomes a logic one until the signal W2 turns to a logic one. During the period when the signal W2 is a logic one, the correcting portion of the optical character recognition card is scanned for correcting unevenness of the 1728 outputs of the charge coupled device sensor 1-4, uneven lamp illumination and the like, as described above. More specifically, the 1728 VIDEO optical signals obtained by scanning of the correcting portion of the optical character recognition card are level corrected and are converted into a digital signal of 6 bits based on a predetermined slice level, whereupon the 6-bit signal is applied to the shift register 1-15. During the correction period of W2="1", the scanning is effected 64 times through counting operation by the counters 735, 736 and the like.

FIG. 12 shows an enlarged view of the scanning region of the charge coupled device sensor 1-4, wherein $P_MN$ indicates a point in the correcting region on the optical character recognition card corresponding to the N-th bit sensor on the M-th scanning line counting after the signal W2 becomes a logic "one".

During the said period of W2="1", an intermittent sampling operation is made of the correcting signal for the purpose of high speed scanning in accordance with the present invention. Such operation will be described wth reference to FIGS. 1 and 2 and the portion enclosed within the dotted line in FIG. 5.

In the first scanning operation after the signal W2 turned to a logic one, the first, second, third and forth VIDEO signals are disregarded by the signal TVG for on/off controlling the transistor TR505 in the analog signal processing circuit in FIG. 5, whereupon the fifth optical signal is caught for the first time. The fifth optical signal becomes the potential VPEAK through the above described circuit operation and the said voltage value is kept until the signal TDISCHARGE for on/off controlling the transistor TR507 becomes a logic zero, and the sixth, seventh, ... twelfth optical signals thereafter obtained are disregarded as shown in VPEAK in FIG. 2. Thus, it is appreciated that the above described signal TVG serves to gate the VIDEO signal.

The signal VPEAK formed based on the fifth optical signal is kept of the said level, and during that period the signals Z and SELECTB applied to the data selector 1-7 are all logic zeros so that the signals obtained from the output terminals Q1, Q2, ... Q6 of the analog-digital control circuit 1-6 are applied to the inputs of the 6-bit digital-analog converter 1-8. Thus, the signal VPEAK applied to the input terminal +1 of the comparator 1-9 during that period is sequentially subjected to analog-digital conversion in accordance with the pulse signals SAD and TAD applied to the analog-digital control circuit 1-6. If and when the clock TAD comes to the rise of the sixth clock after the pulse signal SAD becomes a logic one, the outputs Q6, ... Q1 of the analog-digital control circuit 1-6 provides the value of analog-digital conversion from the signal VPEAK to a digital signal of 6 bits; however, the output is represented by the negative logic. If and when the signal SELECTB becomes a logic one, the data selector 1-7 serves to select the inputs applied to the input terminals Bi and after all the inputs of the 6-bit digital-analog converter 1-8 are supplied with the signals obtained from the outputs SO6, SO5, ... SO0 of the 6×2048 bit shift register 1-15. The output VPA of the 6-bit digital-analog converter 1-8 may be expressed as follows.

$$VPA = - \sum_{N=1}^{6} \overline{SON} \times (0.05) \times 2^{N-1} \quad \text{(Volt)}$$

Since the contents in the shift register 1-15 have been cleared so to be all logic ones before signal W2 becomes a logic one, the relation VPA=0V is attained and thus the relationship of VPA>VPEAK is always attained. Accordingly, the output CO1 of the comparator 1-9 becomes a logic zero and the value is latched by the latch signal TCOMP applied to the D flip-flop 1-12, so that the signal TA<B at the Q output of the flip-flop 1-12 becomes a logic zero. Since in such a situation the signal SELECTB already applied to the data selector 1-7 has become a logic zero, the data selector 1-7 serves to select the input AI, so that the inputs SI6, ... SI1 of the shift register 1-15 have been supplied with the outputs Q6, Q5, ... Q1 of the analog-digital control circuit 1-6 (in such a state the output Q6, Q5, ... Q1 have held the value analog-digital converted from the fifth optical signal).

If and when the signal TCOMP is a logic one, the following equation is attained.

$$TROTATE = (W3 + TA<B + \overline{TCOMP})(W2 + W3)$$
$$= TA<B = \text{``0''}$$

Responsive to the fall of the shift clock pulse SC applied when the signal TCOMP is a logic one, the old 6-bit data in the 6×2048 bit shift register is outputted and the new 6-bit data having the value analog-digital converted of the fifth optical signal is inputted. If and when the signal TDISCHARGE for on/off controlling the resetting transistor TR507 shown in FIG. 5 turns to a logic zero, the said transistor TR507 turns on, whereby the signal VPEAK is reset, and when the signal TDISCHARGE turns to a logic one again the signal VPEAK catches the thirteenth optical signal of the VIDEO singal, and then the above described operation is repeated. Thus, at the first scanning after the signal W2 turns to a logic one, the optical signal corresponding to the point $P_1^{5+8N}$ (N=0, 1, ... 215) is analog-digital converted into the 6 bit data, which is inputted to the shift register 1-15 and is held therein. The said operation is continued until the eighth scanning line after the signal W2 becomes a logic one, and in the M-th scanning line (M=1, 2, ... 8), the following is attained.

$$P_M^{5+8N+(M-1)} = P_M^{4+M+8N}$$

in case of $1 \leq M \leq 4$ $$P_M^{1+8N+(M-5)} = P_M^{M-4+8N}$$

in case of $5 \leq M \leq 8$

The 6-bit data of the optical signal corresponding to the point of (N=0, 1, 2, ... 215) is inputted in the shift register 1-15 and when the scanning of the eight scanning lines is completed after the signal W2 becomes a logic one a number (1728) of 6-bit data as analog-digital converted from the 1728 sensor outputs of the charge coupled device sensor 1-4 all including the optical information reflected from the white background portion of the correcting region of the optical character recognition card are inputted in the 6×2048 bit shift register 1-15.

In the scanning operation of the ninth scanning line after the signal W2 becomes a logic one, the fifth optical signal is caught as in case of the first scanning line and undergoes the analog-digital conversion into the 6-bit data when the signal SELECTB becomes a logic zero, which is then held at the outputs Q1, Q2, ... Q6 of the analog-digital control circuit 1-6. If and when the above described signal SELECTB becomes a logic one, the inputs of the 6-bit digital-analog converter 1-8 have been supplied with the 6 bit data of the fifth optical signal in the first scanning line as stored in the shift register 1-15 and the output VPA of the 6 bit digital-analog converter 1-8 have been providing the fifth analog optical signal of the first scanning line.

Thus, the comparator 1-9 is supplied with the fifth point optical signal of the first scanning line and the fifth point optical signal of the ninth scanning line at the $-_1$ terminal and the $+_1$ terminal, respectively, thereby to make the comparison of both of the signals.

(1) In case where the optical signal in the previous scanning line is larger:

In such a situation the signal TA<B is a logic one and the signal TCOMP becomes a logic one, and the following equation is attained.

$$TROTATE = (W3 + TA<B + \overline{TCOMP})(W2 + W3)$$
$$= TA<B = \text{``1''}$$

Hence, the new input data of the shift register 1-15 is equal to the old data and the 6 bit data of the optical signal of the corresponding point obtained by the previous scanning is held. Meanwhile, the new input data is disregarded.

(2) In case where the optical signal in the previous scanning line is smaller.

In such a situation the signal TA<B becomes a logic zero and when the signal TCOMP becomes a logic one the above described signal TROTATE becomes a logic zero, so that the new input data of the shift register 1-15 is equal to the 6 bit data of the optical signal in the corresponding point of the ninth scanning line (when the signal SELECTB has become a logic zero and hence the 6 bit input of the shift register is equal to the 6-bit output of the analog-digital control circuit), and the old 6 bit data is disregarded, while the new input data is stored in the 6×2048 bit shift register 1-15.

Thus, when the scanning operation of nine scanning lines is completed, the 6×2048 shift register has been loaded with the 6-bit data of the optical signal of either the point $P_1^{5+8N}$ or the point $P_9^{5+8N}$ (N=0, 1, ... 215), whichever is larger. If and when the signal W2 turns to logic zero and all of the scanning operations of the points $P_N^M$ (N=1, 2, ... 64; M=1, 2, ... 1728) is completed, the shift register 1-15 has been loaded as the correcting data of the optical signal at the first sensor point, with the 6-bit data which is the largest among the optical signals corresponding to the points $P_{5+8M}1$ (M=0, 1, ... 7) of the eight lines and, as the correcting data of the optical signal of the second sensor point, with the 6-bit data which is the largest among the optical signals corresponding to the points $P_{6+8M}2$ (M=0, 1, ... 7) of the same eight lines. Similarly, the 6-bit data which is the largest among the optical signals of the corresponding sensor points are kept with respect to the 1728th sensor point.

The maximum value is adopted as the correcting data amont the optical signals corresponding to a plurality of points, because if the optical signal corresponding to only one point, for example, is adopted as the correcting data then the optical signal of that point, if the same had been unfortunately dirty, cannot be used as the correcting data.

Thus, if and when the signal W2 turns again to a logic zero and the signal W3 becomes a logic one, the signal TROTATE=(W3+TA<B+$\overline{TCOMP}$) (W2+W3) becomes a logic one, and the 6-bit correcting data of 1728 pieces of the shift register 1-15 is kept circulating in the shift register.

If and when the signal W2 becomes the logic zero, the signal SELECTB becomes the logic one in accordance with the above described logic equations as written in the read only memory 741 and the data selector selects the outputs SO1, ... SO6 of the shift register 1-15, which output signals are applied to the digital-analog signal 1-8. Thereafter, i.e. after the signal W3 becomes a logic one, the signal TVG applied to the PNP transistor TR505 having a gating function to the VIDEO signal shown in FIG. 5 always assumes a logic one based on the above described logic equations, so that the above described transistor TR505 is not gated, whereby the potential VPEAK is obtained with respect to all the optical signals.

In a situation where the optical signal of the N-th sensor appears, the shift register 1-15 provides the correcting data corresponding to the optical signal of the (N-7)th and it could happen that the timing relationship of both signals does not coincide. Two approaches are available to solve such a problem. More specifically, one approach is that if and when the signal W3 is a logic one the data in the shift register is advanced by a 7-clock time, and the other approach is that the VIDEO signal is delayed by a 7-clock time thereafter until the signal W3 becomes a logic zero. In the embodiment shown an described, the latter mentioned approach has been adopted.

The circuit achieving that approach comprises the NAND gate 715, 716, and 717 and the D flip-flop 718 in the pulse generator 1-2, wherein the start pulse S formed therein is longer in case of W3="1" than in case of W3="0" by 7 clocks T0 in terms of the clocks T0. Thus, the clocks $\phi 1$ and $\phi 2$ applied to the charge coupled device sensor are delayed at the start by a time period corresponding to seven clocks T0 in case of W3="1" as compared with in case of W3="0" as shown in FIGS. 3 and 4. After the signal W3 which is to be read in the article being read becomes a logic one, when the +2 terminal of the comparator 1-10 is supplied with the signal VPEAK corresponding to the optical signal in the N-th sensor point (N=1, 2, ... 1728), the −2 terminal of the comparator 1-10 is supplied with the slice level as corrected generated from the N-th correcting 6-bit data. Accordingly, the BINARY VIDEO signal of the Q output of the D flip-flop is a signal which had been converted from the N-th optical signal into a bivalued signal having either a logic one or a logic zero level at the slice level as corrected, and the above described BINARY VIDEO signal is transferred together with the signals W1, W2, W3, S, and TDO to the optical character recognition circuit 1-19, whereby recognition of the image is effected based on the input information.

Although in the foregoing description of the embodiments the charge coupled sensor was used in the reading station of the optical character recognition apparatus and the relation amond various signals was specifically described, it should be noted that the above described examples should not be construed by way of limitation, the spirit and scope of the present invention being limited only by the appended claims.

What is claimed is:

1. In an image sensor output correcting system comprising:
   an object being read including a background having an optical characteristic level in one direction and image information indicia having an optical characteristic level in the other direction, said object being read including a first region where no image information indicia are recorded and a second region where image information indicia are recorded,
   means for optically scanning along a scanning line successively said object being read for converting the optical characteristics of the portion being scanned into an electrical analog signal, said scanning line covering a plurality of image elements,
   quantizing means, responsive to an analog slicing level, for converting said electrical analog signal, corresponding to the second region of said read object, into a first bivalued digital signal,
   comparison means, operatively coupled to said scanning means and quantizing means, for comparing said analog signal of an element of the scanning line being currently scanned obtainable from said scanning means with another analog signal bearing a fixed relationship to a second bivalued digital signal corresponding to the corresponding element in the preceding scanning line,
   storage means for storing one of said first and second bivalued digital signals,
   the improvement comprising:
   a signal processing means for intermittently sampling the portion of the output of said optical scanner means corresponding to the first region of said read object to generate said analog slicing level in response to said intermittent samples.

2. An image sensor as in claim 1, wherein said quantizing means converts said electrical analog signal obtainable at every predetermined interval in terms of an element in the scanning line into said first bivalued digital signal, such that the position of sampled element is shifted from scanning line to scanning line, and further comprising:
   means operatively coupled to said comparing means for controlling said storage means such that the one of said first and second bivalued digital signals corresponding to the element of said object being read having a larger optical characteristic level in said one direction is stored in said storage means, and wherein said signal processing means further comprises:
   analog slice level signal providing means operatively coupled to said storage means for converting said stored one of said first and second bivalued digital signals of the element of said object being read having the largest optical characteristic level in said one direction into an analog slice level signal which has a predetermined relationship with said stored one of said first and second bivalued digital signals.

3. An image sensor output correcting system, comprising:
   an object being read including a background having an optical characteristic level in one direction and image information indicia having an optical characteristic level in the other direction, said object being read including a first region where no image information indicia are recorded and a second region where image information indicia are recorded,
   means for optically scanning along a scanning line successively said object being read for converting the optical characteristics of the portion being scanned into an electrical analog signal, said scanning line covering a plurality of image elements,
   means for generating a first operation mode signal indicating that said first region of said object being read is being scanned by said scanning means and a second operation mode signal indicating that said second region of said object being read is being scanned by said scanning means,
   means operatively coupled to said scanning means and responsive to said first operation mode signal for converting said electrical analog signal obtainable at every predetermined interval in terms of an element in the scanning line into a digital signal of a predetermined number of bits, such that the position of a sampled element is shifted from scanning line to scanning line, means for storing said digital signal of said predetermined number of bits, means for reading the digital signal of the corresponding element of the preceding scanning line, as stored, in synchronism with the current element being scanned in the scanning line, means coupled to said reading means for conerting said read digital signal into an analog signal representative of the value of said digital signal, means operatively coupled to said scaning means and said digital-analog converting means and responsive to said first operation mode signal for comparing said electrical analog signal of the element of the scanning line being currently scanned obtainable from said scanning means with said analog signal as converted from said digital signal corresponding to said corresponding element in the preceeding scanning line, means operatively coupled to said comparing means and responsive to said first operation mode signal for controlling said store means such that a digital signal corresponding to the element of said object being read having a larger optical characteristic level in said one direction can be stored in said store means, analog slice level signal providing means operatively coupled to said store means for converting said stored digital signal of the element of said object being read having the largest optical characteristic level in said one direction into an analog slice level signal which has a predetermined relationship with said stored digital signal, and means operatively coupled to said scanning means and said analog slice level signal providing means and responsive to said second operation mode signal for slicing, at the level of said analog slice level signal, said electrical analog signal obtainable from said scanning means for converting the same into a bivalued signal on an element basis.

4. An image sensor output correcting system in accordance with claim 3, wherein said scanning means comprises amplifying means for amplifying said electrical analog signal, means for sampling the level representative of the optical characteristic level in said other direction in said electrical analog signal, and means responsive to the output from said sampling means for applying a negative feedback to said amplifying means, whereby fluctuations of said optical characteristic level in said other direction are compensated.

* * * * *

UNITED STATES PATENT AND TRADEMARK OFFICE
CERTIFICATE OF CORRECTION

PATENT NO. : 4,149,143
DATED : April 10, 1979
INVENTOR(S) : Humikazu Nagano et al It is certified that error appears in the above-identified patent and that said Letters Patent are hereby corrected as shown below:

```
Column  3, line 16, "1728bits" should be --1728) bits--.
Column 11, line 15, "dlip-flop" should be --flip-flop--.
Column 12, line 48, "transister" should be --transistor--.
Column 14, line 11, "forth" should be --fourth--.
Column 15, line 21, "singal" should be --signal--.
Column 16, line 18, "." should be --:--.
Column 16, line 50, "amont" should be --among--.
Column 17, line 49, "amond" should be --among--.
Column 19, line 12, "conerting" should be --converting--.
Column 19, line 15, "scaning" should be --scanning--.
```

Signed and Sealed this

Ninth Day of October 1979

[SEAL]

Attest:

RUTH C. MASON
Attesting Officer

LUTRELLE F. PARKER
Acting Commissioner of Patents and Trademarks